Feb. 10, 1970  RYUICHI MASUO ET AL  3,494,433
QUICK OPERATIVE AUTOMATIC BALANCE
Filed April 8, 1968  2 Sheets-Sheet 1
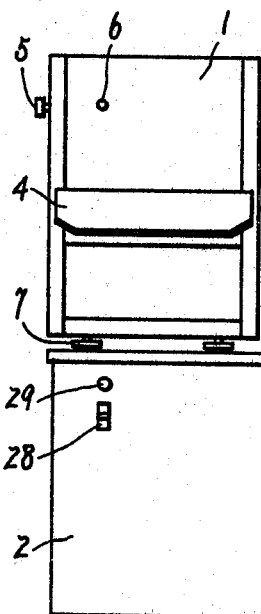
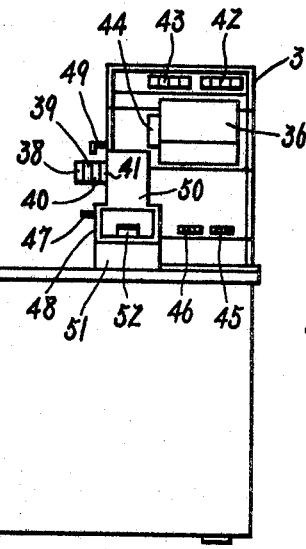
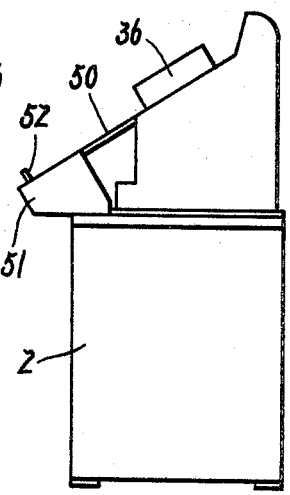
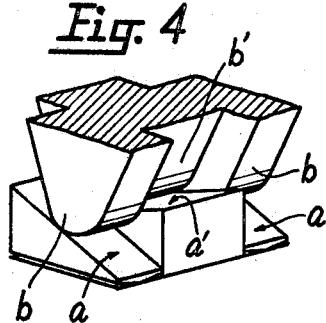
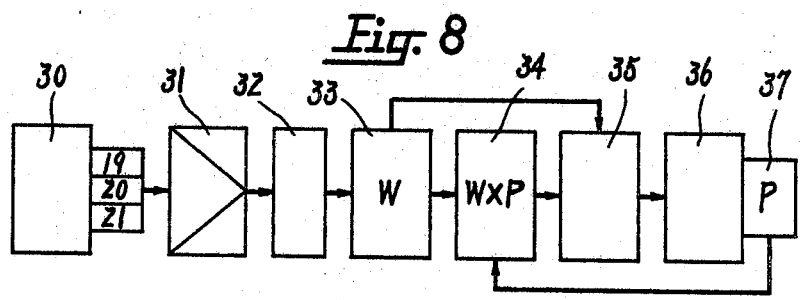
INVENTORS
RYUICHI MASUO, CHIKAYOSHI MAEDA,
AND YOSHINORI TSUDA
BY
*Linton and Linton*
ATTORNEYS

United States Patent Office 3,494,433
Patented Feb. 10, 1970

3,494,433
QUICK OPERATIVE AUTOMATIC BALANCE
Ryuichi Masuo and Chikayoshi Maeda, Hirakata, and Yoshinori Tsuda, Yokosuka, Japan, assignors to Kenseikogyo Kabushiki-Kaisha, Tokyo, Japan, a corporation of Japan
Filed Apr. 8, 1968, Ser. No. 719,423
Int. Cl. G01g 23/42
U.S. Cl. 177—3                              1 Claim

ABSTRACT OF THE DISCLOSURE

An automatic computing scale capable of issuing a price slip and featuring a pendulum type balance with photoelectric metering means to provide the input for the computing means.

---

The present invention relates to automatic balances issuing bills on which values of weight of foodstuffs or other merchandises together with prices corresponding to weight thereof are to be printed upon placing said merchandises on a scale of balance.

An object of the present invention is to provide automatic balances with which time required for weighing is very short in spite of the correctness of weighed values.

Another object of the present invention is to provide automatic balances having means for effecting a speedy delivery of merchandises.

Still another object of the present invention is to provide automatic balances such as described above with simple controlling structures which may realize such automatic balances sufficiently inexpensive for the use in common market stores.

Automatic balances which are to issue bills having values of weight of merchandises together with the corresponding prices printed thereon, upon weighing said merchandises have been known for example by Japanese Patent application publication No. 40–13,914. However, known automatic balances are not quick in operation, and also they are provided with complicated controlling systems. While, these defects as described above may be avoided by a balance which indicates values of weight instantly upon weighing. And, such a balance having a quick indicating capacity is also known. However, such a quick indicating balance only has limited uses, on account of its low weighing accuracy.

The composition, together with effects and advantages of the present invention will be apparent from the following description taken in connection with the accompanying drawings in which:

FIG. 1 is a front elevational view of an embodiment of the present invention.

FIG. 2 is a side elevational view of the embodiment shown in FIG. 1.

FIG. 3 is a front elevational view taken in part of a cross knife edge used in the present invention.

FIG. 4 is an oblique view partly cut off of a cross knife edge used in the present invention.

FIG. 8 is a block diagram of a balance according to the present invention.

Figure 5:
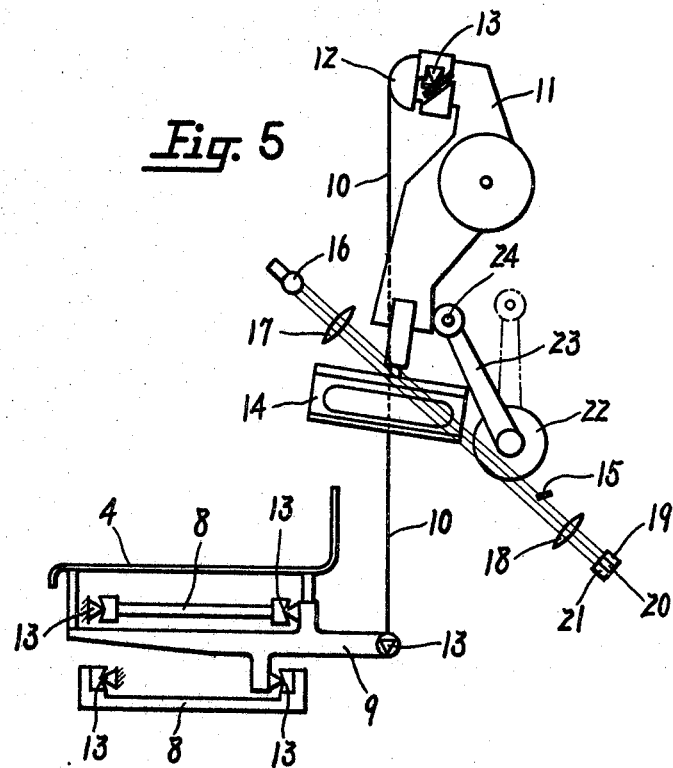
FIG. 5 is a skeleton diagram of a balance according to the present invention.

The words "cross knife edge" used in this specification means a knife blade combined with blade support blocks such as shown in FIGS. 2 and 3 and such as disclosed in Japanese Patent No. 442,534.

Referring to FIGS. 3 and 4, this cross knife edge has a knife blade in contact with blade support blocks and mounted thereon. Each said support block has a surface $a$ or $a'$ which touches the edge $b$ or $b'$ of said knife blade and is oppositely slanted to the surface of a support block adjacent thereto. Center axes $d$ and $d'$ of the respective blade edges $b$ and $b'$ are distanced from each other so as to effect the points of contact of each said blade edge and each said blade support block to be alined. This cross knife edge is invariable in position of fulcrums, and friction between the blade and the blade supports is minimum, even under a force acted in a lateral direction.

An automatic balance according to the present invention is composed of a balance, a computer for computing price in proportion to weight of merchandises upon reception of signals with respect to said weight from said balance, and means for issuing bills having values of weight and price printed thereon upon reception of signals with respect to weight from said computer. Said balance has a pendulum supported by a cross knife edge such as described above, means for detecting the point of balance of said pendulum at no load, means for metering distance between said point of balance and a point of maximum deflection of said pendulum, and rest means for said pendulum for releasing said pendulum from its rest position and refixing said pendulum after the first one cycle of its oscillation to said rest position.

In FIGS. 1 and 2, an automatic balance is illustrated as having a balance 1 and a register 3 for issuing bills mounted on a casing 1. The casing 1 encases a computer for computing weight and a computer for computing price. Balance 1 is provided with a table 4 for placing merchandises thereon for weighing, a knob 5 for adjusting point of balance at no load, an electric lamp 6 for indicating said point of balance when the same is achieved, and screws 7 for adjusting the level of said balance 1.

Figure 7:
FIG. 7 is a diagram showing an optical detector partly cut off used in the present invention.

The operation of this automatic balance is explained at first with reference to FIG. 5. Force caused by a load on table 4 is transmitted through an auxiliary lever 8 to a main lever 9, and further, through a metal tape 10 for transmitting the force to a better dynamic point cam 12 of a pendulum 11. Numeral 13 indicates a cross knife edge which has very small friction. A slitted plate unit 14 such as shown in FIG. 7 is fixed at the other end of pendulum 11. In FIG. 7, a slit element for computation 25 and a slit element for phase detection 26 are drawn in aberration. However actually, slits in these slit elements are engraved in an identical phase, and their aberration in phase is effected to be caused by means of a phase adjusting prism 15. A light projection system composed of an electric lamp 16, a condenser lens 17, and a magnification lens 18 is provided. A photoelectric element for computation 19, a photoelectric element for phase detection 20, and a photoelectric element for the detection of point of balance 21 correspond respectively to said slit element for computation 25, said slit element for phase detection 26, and said slit element for balance point detection 27 in said light projection system. The optical system disclosed above serves as means for detecting balance point of the pendulum at no load and means for metering distance between said balance point and a point of maximum deflection of the pendulum as will be stated in the following description. Rest means for the pendulum are composed of a rotary solenoid 22 for operating said rest means, an arm 23 for the rest 23, and a roller 24 for engaging said pendulum to arm 23.

Figure 6:
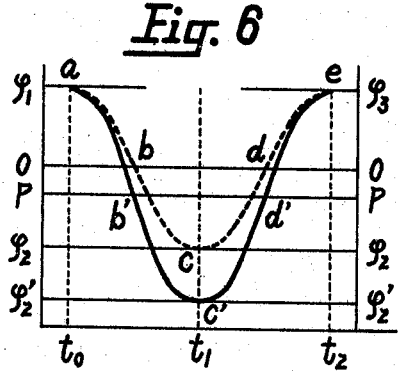
FIG. 6 is a graphic diagram shown in operation of a balance according to the present invention.

First, knob 5 as apparent in FIG. 1 and provided for adjusting said point of balance is operated manually at no load so as to effect a slight movement of slit plate unit 14. By this movement of said slit plate unit, setting of said point of balance 0 as apparent in FIG. 6 is effected by means of slit element for balance point detection 27 and photoelectric element for balance point detection 21 in an optical system. In FIG. 6, the ordinate and the abscissa are drawn respectively in angular distance and time.

Upon removal of the above-mentioned rest means from pendulum 11 at no load, said pendulum oscillates and takes a movement from point $a$ to point $e$ by passing points $b$, $c$, and $d$. In this movement, point $a$ is the position of rest which corresponds to angular position $\varphi_1$, points $b$ and $d$ are the points of balance of the pendulum which correspond to an angular position 0, $c$ is a point of maximum deflection which corresponds to angular position $\varphi_2$, and $e$ is a point of maximum return which corresponds to angular position $\varphi_3$. While, the point of balance 0 should be taken in accordance with an equation as follows:

$$0\varphi_2 = 0\varphi_3 \tag{1}$$

However it is difficult to hold initial conditions of the pendulum at its release from its rest constant, variation in $0\varphi_2$ caused by variation in said initial condition results necessarily in variation in $0\varphi_3$ when the point of balance 0 is taken as stated above. And, said variation in said initial condition can be compensated so as to cause no substantial error in the establishment of said point of balance. Provided that much friction be present between the blade and the blade support which support the pendulum, attenuation in oscillation of the pendulum becomes significant so as to cause a remarkable error under a condition as described in the foregoing. However, by using a cross knife edge, as attenuation in the primary cycle of oscillation of the pendulum is negligibly small no substantial error is caused by said attenuation in oscillation of said pendulum. It may be said that, there is no error caused by the attenuation in oscillation of the pendulum on account of substantial coincidence of angular positions $\varphi_1$ and $\varphi_3$ by a cross knife edge for the supoprt of said pendulum.

Next, upon loading balance table 4 with a load, the pendulum is released from its rest. Then, the pendulum begins to oscillate according to a curve of oscillation, $a-b'-c'-d'-e$. And, in taking point of balance of the pendulum at P, angular distance OP which is in proportion to weight of the load may be computed from an equation as follows:

$$OP = \tfrac{1}{2} \times (0\varphi_2 - 0\varphi_3) \tag{2}$$

For effecting the above computation, a photoelectric element for detecting point of balance 21 is set on the optical axis of slit element for detecting point of balance 27 as shown in FIG. 7. Then, the point of balance of the pendulum is detected by photoelectric on-off action. While, optical pulsations caused by a movement of slit element for computation 25 are counted by means of photoelectric element for computation 19. Also, photoelectric element for phase detection 20 is provided on an optical axis of slit element for phase detection 26. Thus, angular distance $\varphi_2$ is detected from inversion of phase difference between said photoelectric elements 19 and 20. As point of balance at no load 0 is already known, and angular position $\varphi_3$ substantially equals to angular position $\varphi_1$ from the foregoing description, displacement OP of point of balance which is caused by a loading of the balance may be computed from the above Equation 2. As apparent from the above description, the weighing operation is computed within first cycle of oscillation of pendulum 11. After the first cycle of oscillation, pendulum 11 is refixed by said rest means.

Referring now to FIG. 8, outputs of photoelectric elements 19, 20 and 21 in balance 30 is impressed, through an amplifier-reformer 31, and a count discriminator 32, on a reversible counter 33, by which weight W of a merchandise placed on the aforementioned balance table 4 is computed. Then, signal with respect to said weight is transmitted to a controller 35 and also to a multiplicator 34 by which computation of price of said merchandise, upon receipt of output of an unit price setter 37 is done. Signal with respect to price from said multiplicator 34 is impressed on controller 35. Said reversible counter 33, multiplicator 34, and said controller 35 are encased in a computer casing 2 which is shown in FIG. 1. Numerical signal output of controller 35 is impressed on a solenoid group 36 for operating a register for bill 3 so as said register 3 to be operated for effecting printing bills and issuing the same.

In the register 3, there is provided an unit price setter which has change-over knobs 38, 39, 40, and 41 having respectively indications "× Yen 1000," "× Yen 100," "× Yen 10," and "× Yen 1" thereon. This unit price setter is for supplying signals to register 3 and computer 2. In FIGS. 1 and 2, 42 is a window for indicating value of weight in four figures, 43 is window for indicating price in four figures, 44 is a key for changing over computation from a total sum to an intermediate sum of prices and vice versa in printing bills. 45 is a window for the indication of numbers of bills issued, 46 is a window for the total amount of bills issued, 47 is a table for issuing daily account, and 48 is a paper roll for the preservation of records. 49 is an opening for the insertion of printing reliefs upon changing kind of merchandise with respect to weighing. Bills are to pass through a chute 50 and to be heated by a heater 51 so as to be stuck to the merchandise. A switch lever 52 which is to serve also as a stopper for the bills is provided on the face of said heater 51. Upon pushing the lever 52, the processes, weighing of a merchandise, computation, printing of a bill and issuing the same are to be done, and thereupon, state of being ready for the next operation is indicated. Thus, it will be apparent from the above, that it is sufficient for an operator to transfer a merchandise from balance table 4 to heater table 51 for delivering said merchandise.

In the foregoing, an embodiment of the present invention has been described. However, an automatic balance according to the present invention comprises, a balance, means for computing value of weight, means for computing price, and means for printing bills and issuing the same. And, said balance has for support of a pendulum a cross knife edge described in the foregoing, which permits completion of correct weighing during the first cycle of oscillation of said pendulum. Thus, according to the present invention, time required for weighing process corresponds to time required for other processes such as computation of price, and printing of a bill and sticking of said bill on a merchandise which other processes by themselves are to be completed almost in an instant. Accordingly, by the present invention, no control means for covering the difference between time required for the weighing and that required for the later processes composed of computation, printing, sticking of a bill and controlling the same are not required. And, it is possible for an operator of an automatic balance according to the present invention to place a merchandise on a balance table and remove it therefrom in an instant so as to stick the bill on said merchandise in conformity with his own speed, no matter how quick his action is:

As stated above, by using an automatic balance according to the present invention, with simple structures on account of having no control means for covering time difference between weighing process and other processes, and being operated quickly and correctly, a remarkable improvement in work efficiency is to be expected particularly in self service super-stores, or in factories supplying merchandises to such super-stores.

Having thus described our invention what we claim is:

1. In an automatic balance including a balance, a computer for computing price in proportion to weight of merchandise upon reception of signals with respect to value of said weight from said balance, and means for issuing bills having said value of weight and price of said merchandise printed thereon upon reception of signals with respect to said value of weight from said computer; the improvement which comprises a balance having a pendulum supported by a cross knife edge provided with a knife blade in contact with blade support blocks and mounted thereon, each said blade support block having a surface which touches an edge of said knife blade and is oppositely slanted to the surface of an adjacent blade support block, said edge of said knife blade having a center axis distanced from the center axis of another edge adjacent thereto of said knife blade so as to effect the points of contact of each said blade edge and each said blade support block to be alined, means for detecting point of balance of said pendulum at no load, means for metering distance between said point of balance and a point of maximum deflection of said pendulum, and rest means for said pendulum for releasing said pendulum from its rest position and refixing said pendulum to said rest position after the first cycle of oscillation of said pendulum.

References Cited

UNITED STATES PATENTS

| | | | |
|---|---|---|---|
| 2,313,179 | 3/1943 | Sprecker et al. | 177—3 |
| 2,803,448 | 8/1957 | Biebel | 177—3 |
| 3,129,879 | 4/1964 | Kuhnle et al. | |
| 3,130,802 | 4/1964 | Bell. | |

ROBERT S. WARD, JR., Primary Examiner

GEORGE H. MILLER, JR., Assistant Examiner

U.S. Cl. X.R.

177—216; 235—58